(12) United States Patent
Liu et al.

(10) Patent No.: US 9,776,639 B2
(45) Date of Patent: Oct. 3, 2017

(54) METHOD, AND APPARATUS, AND SYSTEM FOR GENERATING DRIVING BEHAVIOR GUIDING INFORMATION

(71) Applicant: LAUNCH TECH CO., LTD., Shenzhen, Guangdong (CN)

(72) Inventors: Jun Liu, Guangdong (CN); Qichao Chen, Guangdong (CN)

(73) Assignee: LAUNCH TECH CO., LTD., Shenzhen, Guangdong (CN)

( * ) Notice: Subject to any disclaimer, the term of this patent is extended or adjusted under 35 U.S.C. 154(b) by 91 days.

(21) Appl. No.: 14/774,479

(22) PCT Filed: Jan. 15, 2015

(86) PCT No.: PCT/CN2015/070730
§ 371 (c)(1),
(2) Date: Sep. 10, 2015

(87) PCT Pub. No.: WO2016/019706
PCT Pub. Date: Feb. 11, 2016

(65) Prior Publication Data
US 2016/0207540 A1    Jul. 21, 2016

(30) Foreign Application Priority Data

Aug. 5, 2014 (CN) .......................... 2014 1 0384288

(51) Int. Cl.
*G05D 1/00* (2006.01)
*G06F 7/00* (2006.01)
(Continued)

(52) U.S. Cl.
CPC ............. *B60W 40/09* (2013.01); *B60C 23/00* (2013.01); *B60W 40/072* (2013.01); *G01S 19/13* (2013.01);
(Continued)

(58) Field of Classification Search
None
See application file for complete search history.

(56) References Cited

U.S. PATENT DOCUMENTS 6,095,945 A * 8/2000 Graf ..................... B60K 28/165
477/110
6,487,475 B1 * 11/2002 Yoshikawa ............ G08B 21/06
340/439

(Continued)

FOREIGN PATENT DOCUMENTS

| CN | 101497336 | 8/2009 |
| CN | 102795224 | 11/2012 |

(Continued)

*Primary Examiner* — Bhavesh V Amin
(74) *Attorney, Agent, or Firm* — Hamre, Schumann, Mueller & Larson, P.C.

(57) ABSTRACT

The present invention is applicable to the field of vehicle, and provides a method and apparatus and system for generating vehicle guiding information. The method for generating vehicle guiding information comprises: receiving operating information of a vehicle, position information of a vehicle and road condition information which are sent from a vehicle client-side; generating driving behavior guiding information according to the operating information of the vehicle, the position information of the vehicle and the road condition information; transmitting the driving behavior guiding information to the vehicle client-side designated by the driver of the vehicle. In the present invention, a server can generate the driving behavior guiding information according to the vehicle operating information, the vehicle position information, and the road surface condition information sent from the vehicle client-side; the driving behavior guiding information provides vehicle drivers with instant prompt and help, and can assist the vehicle drivers in making reasonable judgments and amend their personal driving behaviors.

5 Claims, 3 Drawing Sheets

(51) Int. Cl.
*G01C 22/00* (2006.01)
*B60W 40/09* (2012.01)
*B60W 40/072* (2012.01)
*B60C 23/00* (2006.01)
*G01S 19/13* (2010.01)
*B60W 50/14* (2012.01)

(52) U.S. Cl.
CPC ... *B60W 2050/143* (2013.01); *B60W 2520/10* (2013.01); *B60W 2520/28* (2013.01); *B60W 2540/18* (2013.01); *B60W 2550/12* (2013.01); *B60W 2550/14* (2013.01); *B60W 2550/142* (2013.01); *B60W 2550/146* (2013.01); *B60W 2550/402* (2013.01)

(56) References Cited

U.S. PATENT DOCUMENTS

| | | | | |
|---|---|---|---|---|
| 7,206,697 | B2* | 4/2007 | Olney | B60K 31/0008 701/300 |
| 2001/0018628 | A1* | 8/2001 | Jenkins | G08G 1/127 701/33.4 |
| 2002/0082771 | A1* | 6/2002 | Anderson | G01C 21/3484 701/423 |
| 2002/0091473 | A1* | 7/2002 | Gardner | G07C 5/0808 701/32.7 |
| 2002/0116156 | A1* | 8/2002 | Remboski | G09B 9/052 702/188 |
| 2002/0120371 | A1* | 8/2002 | Leivian | B60R 16/0231 701/1 |
| 2002/0120374 | A1* | 8/2002 | Douros | G09B 9/052 701/34.4 |
| 2002/0128751 | A1* | 9/2002 | Engstrom | B60W 30/18181 701/1 |
| 2002/0128774 | A1* | 9/2002 | Takezaki | B60Q 9/00 701/431 |
| 2003/0187578 | A1* | 10/2003 | Nishira | B60T 7/16 701/301 |
| 2004/0036601 | A1* | 2/2004 | Obradovich | G08G 1/167 340/540 |
| 2004/0252027 | A1* | 12/2004 | Torkkola | G08B 21/06 340/576 |
| 2004/0254698 | A1* | 12/2004 | Hubbard | G08G 1/0104 701/32.7 |
| 2005/0131597 | A1* | 6/2005 | Raz | G09B 19/167 701/29.1 |
| 2005/0251335 | A1* | 11/2005 | Ibrahim | G01C 21/30 701/469 |
| 2006/0052917 | A1* | 3/2006 | Schwarzhaupt | B60T 7/12 701/31.4 |
| 2006/0212193 | A1* | 9/2006 | Breed | B60C 23/0425 701/33.7 |
| 2006/0244581 | A1* | 11/2006 | Breed | B60C 23/0433 340/447 |
| 2007/0027583 | A1* | 2/2007 | Tamir | G06Q 30/0283 701/1 |
| 2007/0050121 | A1* | 3/2007 | Ammon | B60C 23/061 701/80 |
| 2007/0136078 | A1* | 6/2007 | Plante | G06Q 10/00 348/148 |
| 2007/0158128 | A1* | 7/2007 | Gratz | B60R 25/1004 180/287 |
| 2007/0257804 | A1* | 11/2007 | Gunderson | G07C 5/0891 340/576 |
| 2007/0271105 | A1* | 11/2007 | Gunderson | G06Q 10/087 705/1.1 |
| 2008/0111670 | A1* | 5/2008 | Wilbrink | G08G 1/166 340/438 |
| 2008/0156406 | A1* | 7/2008 | Breed | B60C 23/041 152/415 |
| 2008/0174451 | A1* | 7/2008 | Harrington | G08B 21/06 340/905 |
| 2008/0255722 | A1* | 10/2008 | McClellan | B60R 25/102 701/31.4 |
| 2009/0037465 | A1* | 2/2009 | Marti | G06F 17/30241 |
| 2009/0079555 | A1* | 3/2009 | Aguirre De Carcer | G07C 5/008 340/441 |
| 2009/0082917 | A1* | 3/2009 | Adachi | G08G 1/0104 701/420 |
| 2009/0125177 | A1* | 5/2009 | Tanaka | B60G 17/0165 701/31.4 |
| 2009/0187343 | A1* | 7/2009 | Koch-Groeber | B60K 35/00 701/301 |
| 2009/0210257 | A1* | 8/2009 | Chalfant | G06Q 40/08 705/4 |
| 2009/0234552 | A1* | 9/2009 | Takeda | B60W 30/16 701/96 |
| 2009/0298482 | A1* | 12/2009 | Yen | H04M 1/6075 455/414.2 |
| 2009/0306834 | A1* | 12/2009 | Hjelm | H04L 12/2809 701/1 |
| 2010/0033333 | A1* | 2/2010 | Victor | A61B 3/113 340/576 |
| 2010/0157061 | A1* | 6/2010 | Katsman | G07C 5/0866 348/149 |
| 2010/0205012 | A1* | 8/2010 | McClellan | G06Q 40/08 705/4 |
| 2010/0207787 | A1* | 8/2010 | Catten | G06F 17/30241 340/905 |

FOREIGN PATENT DOCUMENTS

| | | |
|---|---|---|
| CN | 103359121 | 10/2013 |
| CN | 203344662 | 12/2013 |
| CN | 104163173 | 11/2014 |
| EP | 2724911 | 4/2014 |
| WO | 2013/159954 | 10/2013 |

* cited by examiner

METHOD, AND APPARATUS, AND SYSTEM FOR GENERATING DRIVING BEHAVIOR GUIDING INFORMATION

TECHNICAL FIELD

The present application relates to the technical field of vehicles, and more particularly, relates to a method, apparatus, and system for generating driving behavior guiding information.

BACKGROUND

With the reduction of manufacturing cost, cars are used more and more widely and have come into thousands of families. However, in respect of vehicle driving skills, fresh hands are usually hateful and horrible roles, so to speak, quite a few traffic incidents are caused by fresh hands directly or indirectly. The reason for causing this situation is that, to some extent, skill of fresh hands is poor, however, the main reason for this situation is that the fresh hands lack experience.

In view of this situation, if warnings relating driving skills can be given to fresh hands in circumstances of bad weathers or worse road conditions, so that fresh hands are enabled to avoid making mistakes made by them most frequently and grasp handling skill, it is very helpful to the fresh hands. However, most cars in the prior art couldn't provide car drivers with sweet driving advice and driving assistance according to the needs of the car drivers.

BRIEF SUMMARY

The embodiments of the present invention provides a method, apparatus, and system for generating driving behavior guiding information, aiming at solving the technical problem that cars in the prior art couldn't provide vehicle drivers with sweet driving advice and driving assistance according to the needs of the vehicle drivers.

In one aspect, the present invention provides a method for generating driving behavior guiding information, the method comprises:

receiving operating information of a vehicle, position information of a vehicle and road condition information sent from a vehicle client-side;

generating driving behavior guiding information according to the operating information of the vehicle, the position information of the vehicle and the road condition information;

transmitting the driving behavior guiding information to another client-side designated by a driver of the vehicle.

Preferably, the vehicle operating information includes a current vehicle speed, a current steering angle of a steering wheel of the vehicle, and a current revolving speeds of tires of the vehicle; generating the driving behavior guiding information according to the operating information of the vehicle, the position information of the vehicle and the road condition information comprises:

obtaining local weather conditions for several continuous days;

confirming a damping coefficient of a road surface via the local weather conditions and the road surface condition information;

obtaining pressure values and revolving speeds of the tires of the vehicle under the circumstance that the vehicle travels in a normal condition according to the current vehicle speed;

calculating current pressure values of the tires according to the revolving speeds of the tires working in a normal condition, the damping coefficient of the road surface, the pressure values of the tires working in normal condition, the current steering angle of the steering wheel of the vehicle, a predetermined correcting parameter, and the current revolving speeds of the tires;

if the current pressure values of the tires exceed or is less than the pressure values of the tires working in the normal condition, generating the driving behavior guiding information for providing vehicle drivers with guidance of driving within a limited speed or inflating the tires of the vehicle immediately.

Preferably, the vehicle operating information includes a current vehicle speed, the road condition information includes turning information of a road surface, generating of the driving behavior guiding information according to the operating information of the vehicle, the position information of the vehicle and the road condition information comprises:

judging whether the vehicle is driven into a sharp turn position of the road surface;

if yes, judging whether the vehicle is able to pass through the sharp turn position safely according to the current vehicle speed and the vehicle position information, and warning the driver of the vehicle to slow down and drive with a slow speed.

Preferably, the vehicle operating information includes a current vehicle speed and a current revolving speed of the engine of the vehicle, the road surface condition information includes a gradient information of road surface, generating of the driving behavior guiding information according to the operating information of the vehicle, the position information of the vehicle and the road condition information comprises:

judging whether the vehicle moves into a steep gradient position of road surface according to the gradient information of the road surface;

if yes, judging whether the vehicle is able to pass through the steep gradient position according to the current vehicle speed, the current revolving speed of the engine of the vehicle and the position information of the vehicle, and warning the driver of the vehicle to accelerate drive speed or slow down and drive with a slow speed.

In another aspect, the present invention provides an apparatus for generating driving behavior guiding information, the apparatus comprises:

an information receiving unit configured for receiving operating information of a vehicle, position information of a vehicle and road condition information sent from a vehicle client-side;

a guiding information generating unit configured for generating driving behavior guiding information according to the operating information of the vehicle, the position information of the vehicle and the road condition information;

a guiding information transmitting unit configured for transmitting the driving behavior guiding information to another client-side designated by a driver of the vehicle.

Preferably, the operating information of the vehicle includes a current vehicle speed, a current steering angle of a steering wheel of the vehicle, and a current revolving speeds of the tires of the vehicle, the guiding information generating unit comprises:

a weather condition obtaining module configured for obtaining local weather conditions for several continuous days;

a damping coefficient obtaining unit configured for confirming a damping coefficient of a road surface via the local weather conditions and the road condition information;

a normal pressure value and revolving speed obtaining module configured for obtaining pressure values and revolving speeds of the tires of the vehicle under the circumstance that the vehicle travels in a normal condition according to the current vehicle speed;

a current pressure value calculating module configured for calculating current pressure values of the tires of the vehicle according to the revolving speeds of the tires working in a normal condition, the damping coefficient of the road surface, the pressure values of the tires working in normal condition, the current steering angle of the steering wheel of the vehicle, a predetermined correcting parameter and the current revolving speeds of the tires of the vehicle;

a tire steering guiding information generating module configured for generating the driving behavior guiding information for providing vehicle drivers with guidance of driving within limited speed or inflating the tires of the vehicle immediately if the pressure values of the tires of the vehicle exceed or are less than the pressure values of tires working in normal condition.

Preferably, the operating information of the vehicle includes a current vehicle speed, the road condition information includes a turning information of a road surface, the guiding information generating unit comprises:

a sharp turn judging module, is configured for judging whether the vehicle is driven into a sharp turn position of the road surface;

a sharp turn driving guiding module, is configured for judging whether the vehicle is able to pass through the sharp turn position safely according to the current vehicle speed and the position information of the vehicle, and warning the driver of the vehicle to slow down and drive with a slow speed when the vehicle is driven into the sharp turn position of the road surface.

Preferably, the operating information of the vehicle includes a current vehicle speed and a current revolving speed of the engine of the vehicle, the road surface condition information includes a gradient information of the road surface, the guiding information generating unit comprises:

a gradient judging unit configured for judging whether the vehicle is driven into a steep gradient position of the road surface according to the gradient information of the road surface;

a gradient driving guiding module configured for judging whether the vehicle is able to pass through the steep gradient position according to the current vehicle speed, the current revolving speed of the engine of the vehicle and the position information of the vehicle, and warning the driver of the vehicle to accelerate drive speed or slow down and drive with a slow speed when the vehicle is driven into the steep gradient position of the road surface.

In another aspect, the present invention provides a system for generating driving behavior guiding information, the system comprises a vehicle client-side, a server and a client-side designated by a driver of a vehicle, the vehicle client-side is configured for obtaining the operating information of the vehicle, the position information of the vehicle and the road surface condition information, and transmitting the operating information of the vehicle, the position information of the vehicle and the road surface condition information obtained to the server, a driving behavior guiding information is generated by the server according to the operating information of the vehicle, the position information of the vehicle and the road surface condition information, and the driving behavior guiding information is transmitted from the server to another client-side designated by a driver of the vehicle, wherein, the server comprises the above-described apparatus for generating driving behavior guiding information.

Preferably, the vehicle client-side comprises:

a vehicle operating information obtaining module connected to a vehicle-mounted self-diagnostic system of the vehicle and configured for obtaining the operating information of the vehicle;

a global position system module configured for obtaining the position information of the vehicle;

a gravity sensor configured for obtaining the road surface condition information;

an information transmitting module configured for transmitting the operating information of the vehicle, the position information of the vehicle and the road surface condition information to the server.

In the embodiments of the present invention, the server can generate the driving behavior guiding information according to the vehicle operating information, the vehicle position information, and the road surface condition information sent from the vehicle client-side. The driving behavior guiding information can provide vehicle drivers with instant prompt and help and can assist the vehicle drivers in making reasonable judgments and amend their personal driving behaviors,

DETAILED DESCRIPTION OF THE PREFERRED EMBODIMENT

In order to make the technical features, the purpose and the technical effect of the present application be more clear, the present application will be described in detail with reference to the accompanying drawings and embodiments. It should be understood that the specific embodiments described herein are used for the purpose of the interpretation of the present invention merely, rather than the limitation to the present invention.

In the embodiments of the present invention, a vehicle client-side is configured for obtaining operating information of a vehicle, position information of a vehicle and road side information.

The implementation of the present invention shall be described in detail in combination with specified embodiments in the following:

First Embodiment

Figure 1:
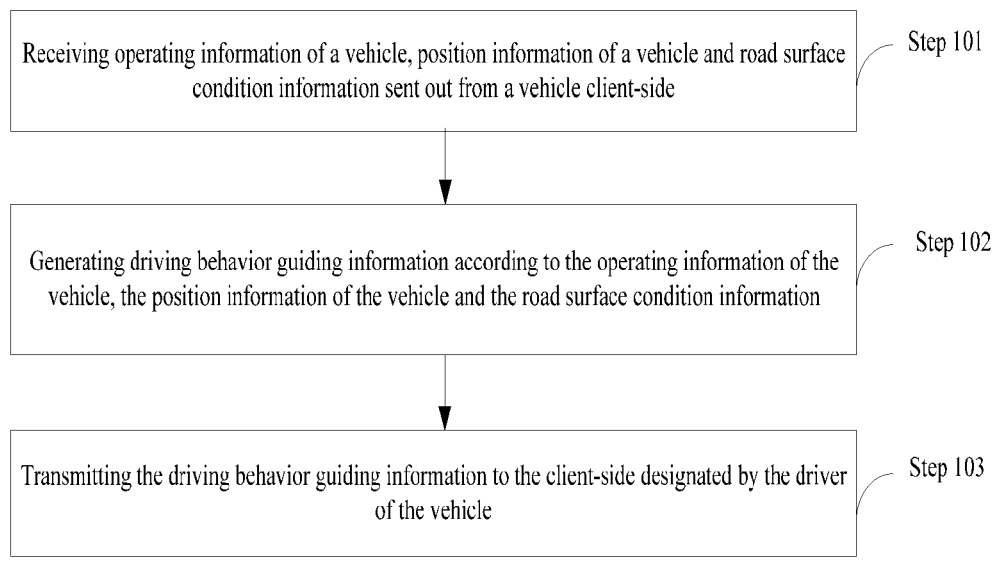
FIG. 1 illustrates an implementing flow chart of a method for generating driving behavior guiding information in accordance with a first embodiment of the present application.

FIG. 1 shows an implementation flow chart of a method for generating driving behavior guiding information provided by the first embodiment of the present invention, the method is performed in a system for generating driving behavior guiding information, the driving behavior guiding information includes a vehicle client-side, a server, and another client-side designated by a driver of a vehicle. Take a server-side for example, the method for generating driving behavior guiding information is explained in detail as follows:

Step 101, receiving operating information of a vehicle, position information of a vehicle and road surface condition information of a vehicle sent from a vehicle client-side.

In the embodiment of the present invention, the vehicle client-side is mounted on the vehicle, and the operating information of the vehicle, the position information of the vehicle and the road surface condition information can be obtained and transmitted to the server by the vehicle client-side.

Figure 2:
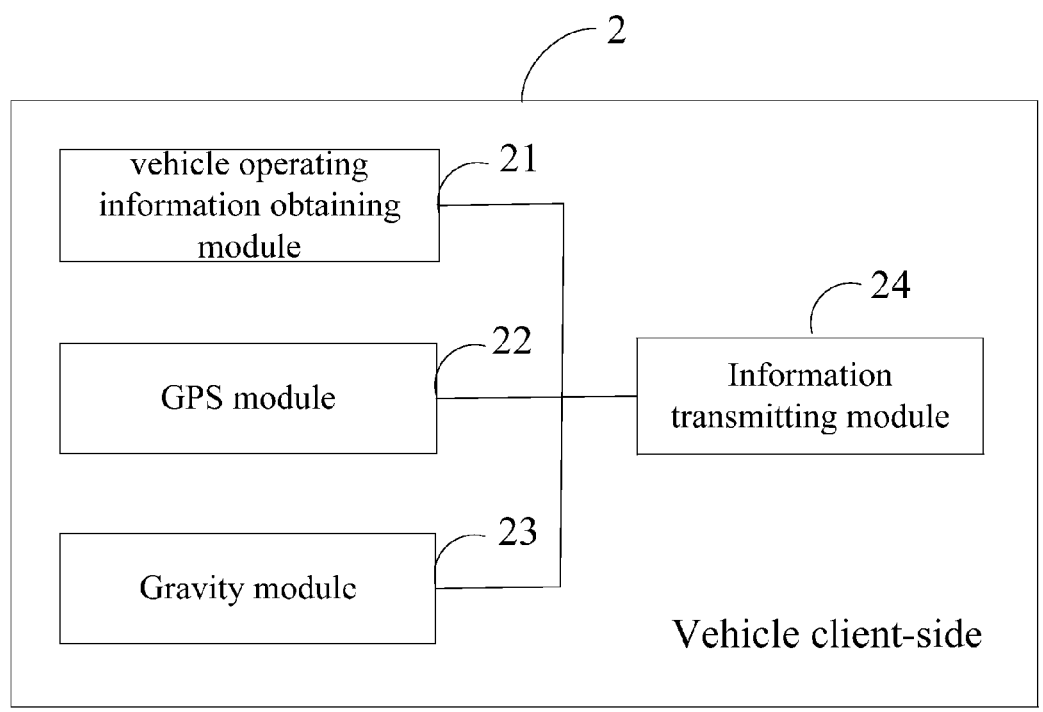
FIG. 2 illustrates a structural block diagram of a vehicle client-side in accordance with the first embodiment of the present application.

Concretely, the vehicle client-side 2 is shown in FIG. 2, wherein the vehicle client-side 2 comprises a vehicle operating information obtaining module 21, a GPS (Global Position System) module 22, a gravity sensor 23 and an information transmitting module 24.

Wherein, the vehicle operating information obtaining module 21 is connected to a vehicle self-diagnostic system of the vehicle and configured for obtaining operating information of the vehicle, the operating information of the vehicle includes a current vehicle speed, a current revolving speed of the engine of the vehicle, a current steering angle of the steering wheel of the vehicle, current revolving speeds of every tire of the vehicle, gears and brake information of the vehicle.

The GPS (Global Position System) module 22 is configured for obtaining position information of the vehicle;

The gravity sensor 23 is configured for obtaining road surface condition information, the road condition information includes gradient information of road condition, sharp turn information of road surface and the information indicating whether road surface is flat.

The information transmitting module 24 is configured for transmitting the operating information of the vehicle, the position information of the vehicle and the road surface condition information to the server.

Wherein, the vehicle operating information obtaining module comprises a CAN (Controller Area Network) bus sub-module and a diagnosis sub-module. The CAN bus sub-module and the diagnosis sub-module are connected to an OBD (On-Board Diagnostic) system of the vehicle to monitor the controller area network data of the vehicle and then obtain the operating information of the vehicle, the vehicle operating information includes the current vehicle speed, the current revolving speed of the engine of the vehicle, and the current steering angle of the steering wheel of the vehicle and the current revolving speeds of every tire of the vehicle, and so on.

Wherein, the OBD system is able to monitor the working situations of the engine electronic-controlled system and other function modules of the vehicle, when an abnormal working situation is found, the specified fault is determined by a specified algorithm stored in a memorizer of the OBD system in the form of DTC (Diagnostic Trouble Codes). The useful information obtained by the OBD system self-diagnosis is capable of providing help for vehicle repair and maintenance, a vehicle repair man can read fault codes by professional instruments provided by the original vehicle manufacturing factory, so that the position where the fault is generated can be located rapidly, which is good for vehicle repair, and the time of artificial diagnosis can be reduced.

The CAN bus is developed by a German company named Bosch, which is famous for developing and producing electronic products regarding vehicles, and the CAN bus has become an international standard (ISO11898) finally. The CAN bus is one of the field buses which are used most widely in the world. In North America and Western Europe, CAN bus has became a standard bus for vehicle computer control system and embedded industry control local area networks, and has developed J1939 protocol, which adopts CAN as its bottom protocol, and is designed especially for heavy-duty goods vehicles and heavy industrial machinery vehicle. In recent years, the CAN bus has been got attention because of its high reliability and excellent error detecting capability, and is widely used in computer control systems for vehicles and the industrial environments with hostile environment temperatures, high electromagnetic radiations and strong vibrations.

Specifically, the information transmitting module 24 is a 3G (the third generation mobile communication technology) module, the operating information of the vehicle, the position information of the vehicle and the road surface condition information can be transmitted to the server by the 3G module.

Besides, the vehicle client-side 2 further comprises a key door switch (ACC) ignition detection module, the key door switch (ACC) ignition detection module is used for obtaining engine information of a vehicle. Other modules of the vehicle client-side 2 can start to work after the key door switch (ACC) ignition detection module is started.

Step 102, generating driving behavior guiding information according to the operating information of the vehicle, the position information and the road surface condition information.

In the embodiment of the present invention, the server can generate corresponding driving behavior guiding information according to the operating information of the vehicle, the position information and the road surface condition information received.

For example, when the operating information of the vehicle includes a current vehicle speed, a current steering angle of the steering wheel of the vehicle, and rotation speeds of the tires of the vehicle, driving behavior guiding information for providing the driver of the vehicle with guidance of driving within limited speed or inflating the tires of the vehicle immediately is generated according to the operating information of the vehicle, the position information of the vehicle and the road surface condition information.

Generating the driving behavior guiding information for providing the driver of the vehicle with guidance of driving within limited speed or inflating the tires of the vehicle immediately according to the operating information of the vehicle, the position information of the vehicle and the road surface condition information specifically comprise the sub-steps as follows:

Step 1, obtaining local weather conditions of several continuous days according to the vehicle position information.

The server obtains the local weather conditions of several continuous days via a network when it receives the position information of the vehicle from the vehicle client-side.

Step 2, confirming a damping coefficient of road surface according to the weather conditions and the road surface condition information.

Step 3, obtaining pressure values and revolving speeds of the tires working in normal condition according to the current vehicle speed when the vehicle is travelling in normal condition.

Step 4, calculating current pressure values of the tires according to the revolving speeds of the tires working in normal condition, the damping coefficient of road surface, the pressure values of the tires working in normal condition, the current steering angle of the steering wheel of the vehicle, a predetermined correcting parameter and the current revolving speeds of the tires;

wherein, the algorithm for calculating current pressure values of the tires is as follows:

The current pressures of the tires are equal to (the revolving speed of the tires worked in normal condition)×(the damping coefficient of road surface)×(the pressure value of the tires worked in normal condition)×(cosine (current steering angle of the steering wheel of the vehicle))×correcting parameter/(the revolving speed of the tires worked in normal condition).

Step 5, when the current pressure values of the tires exceed or are less than the pressure values of the tires working in normal condition, generating driving behavior guiding information for providing the driver of the vehicle with guidance of driving within limited speed or inflating the tires of the vehicle immediately.

Additionally, when the operating information of the vehicle includes a current vehicle speed, and the road surface condition information includes turning information of road surface, generating driving behavior guiding information configured for warning the driver of the vehicle to slow down and drive with a slow speed according to the operating information of the vehicle, the position information of the vehicle and the road surface condition information.

Generating the driving behavior guiding information configured for warning the driver of the vehicle to slow down and drive with a slow speed according to the operating information of the vehicle, the position information of the vehicle and the road surface condition information can specifically comprise the steps as follows:

Step 11, judging whether the vehicle is moving into a sharp turn position.

Step 12, if yes, judging whether the vehicle is able to pass through the sharp turn position according to the current vehicle speed and the position information of the vehicle and warning the driver of the vehicle to slow down and drive in a slow speed.

The step 12 is described in detail in the following:

when it is monitored that the vehicle is about to move into a sharp turn position, the server obtains the position information of the vehicle from the GPS information of the vehicle, judges whether the vehicle is able to pass through the sharp turn position according to the current vehicle speed, and warns the driver of the vehicle to slow down and drive in a slow speed.

Besides, when the operating information of the vehicle includes a current vehicle speed, and a current revolving speed of the engine of the vehicle, and the road surface condition information includes gradient information of road surface, generating driving behavior guiding information for warning the driver of the vehicle to accelerate the drive speed or slow down and drive with a slow speed according to the operating information of the vehicle, the position information of the vehicle and the road surface condition information.

Generating the driving behavior guiding information for warning the driver of the vehicle to accelerate drive speed or slow down and drive with a slow speed according to the operating information of the vehicle, the position information of the vehicle and the road surface condition information specifically comprise the following steps:

Step 21, judging whether the vehicle is driven into a gradient position of road surface according to the gradient information of road surface;

Step 22, if yes, judging whether the vehicle is able to pass through the gradient position normally according to the current vehicle speed, the revolving speed of the engine of the vehicle and the road surface condition information of the vehicle, and warning the driver of the vehicle to accelerate drive speed or slow down and drive with a slow speed.

The step 22 is described in detail as follows:

when it is monitored that the vehicle is about to move into a gradient position, the server obtains the position information of the vehicle from the GPS information of the vehicle, judges whether the vehicle is able to pass through the gradient position according to the current vehicle speed and the current revolving speed of the engine of the vehicle, and warns the driver of the vehicle to accelerate the drive speed or slow down and drive in a slow speed.

Step 103, transmitting the driving behavior guiding information to another client-side designated by the driver of the vehicle.

In the embodiment of the present invention, a binding relationship between the vehicle and the client-side designated by the driver of the vehicle is pre-established. After generating corresponding driving behavior guiding information according to the operating information of the vehicle, the position information of the vehicle and the road surface condition information, the server can send driving behavior guiding information to the vehicle client-side bound with the vehicle, the driver of the vehicle can look over the current driving behavior guiding information and historical driving behavior guiding information of the vehicle, and modify personal driving behaviors according to the current driving behavior guiding information and historical driving behavior guiding information of the vehicle.

In the embodiment of the present invention, after the server receives the operating information of the vehicle, the position information of the vehicle and the road surface condition information sent from the vehicle client-side, it can generate the corresponding driving behavior guiding information according to the operating information of the vehicle, the position information of the vehicle and the road surface condition information, and send the driving behavior guiding information to the driver of the vehicle. The driver of the vehicle can modify his/her driving behavior according to the driving behavior guiding information. For drivers, especially those fresh drivers, the traffic incidents, which are unnecessary to happen, can be avoided to the utmost extent according to this sweet driving behavior guiding information.

Those skilled in the art should understand part or all of the procedures be accomplished by relevant hardware instructed by procedures, the procedures can be stored in computer readable storage media, the storage media includes Read Only Memory, Random Access Memory, magnetic disk, optical disk and so on.

Second Embodiment

Figure 3:
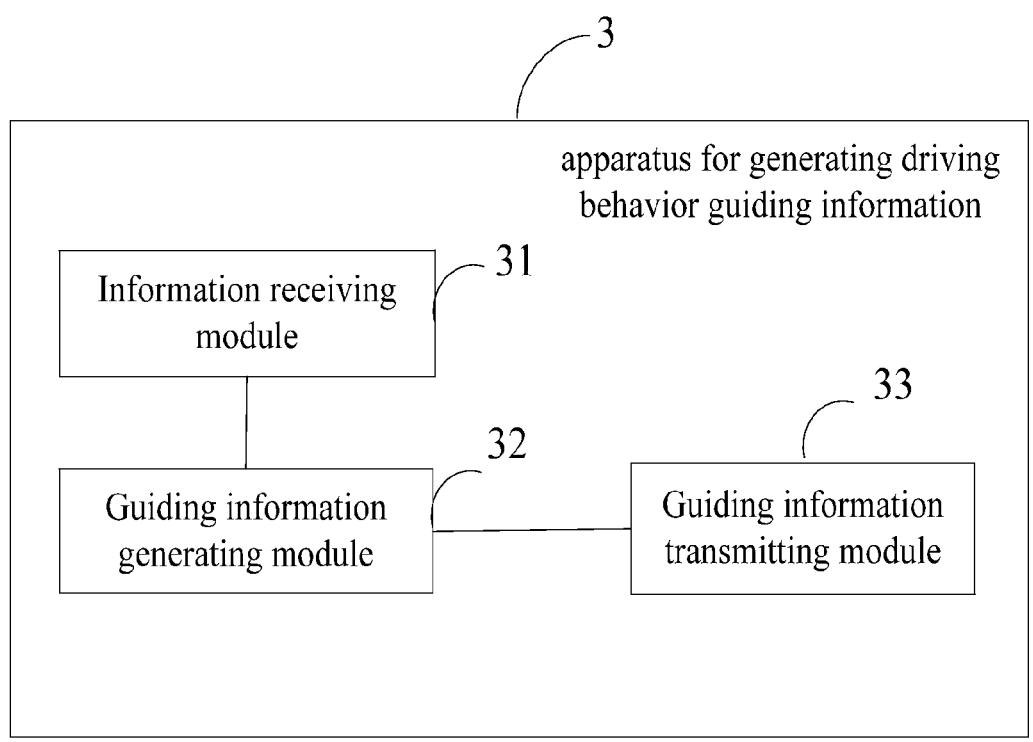
FIG. 3 illustrates a structural block diagram of an apparatus for generating driving behavior guiding information in accordance with a second embodiment of the present application.

FIG. 3 shows a specified structural block diagram of an apparatus for generating driving behavior guiding information provided by the second embodiment of the present invention. For convenient explanation, only the part relating to the second embodiment of the present invention is described. The apparatus 3 for generating driving behavior guiding information can be a software unit, a hardware unit, or a unit combining a software unit with a hardware unit built inside a server, the server can cooperate with a vehicle client-side and another client-side designated by the driver of the vehicle to form a system for generating driving behavior guiding information. In the system, the vehicle client-side is configured for obtaining operating information of the vehicle, position information of the vehicle and road surface condition information and transmitting the obtained vehicle operating information, vehicle position information, and road surface condition information to the server, the structure of the vehicle client-side is shown in FIG. 2, and is not repeated herein. The server generates driving behavior guiding information according to the vehicle operating information, the vehicle position information, and the road surface condition information, and transmits the driving behavior guiding information to the client-side designated by the driver of the vehicle. The apparatus 3 for generating driving behavior guiding information comprises an information receiving unit 31, a guiding information generating unit 32, and a guiding information transmitting unit 33.

Wherein, the information receiving unit 31 is configured for receiving operating information of a vehicle, position information of a vehicle and road condition information sent from the vehicle client-side;

the guiding information generating unit 32 is configured for generating driving behavior guiding information according to the operating information of the vehicle, the position information of the vehicle and the road condition information;

the guiding information transmitting unit 33 is configured for transmitting the driving behavior guiding information to the client-side designated by the driver of the vehicle.

Specifically, the operating information of the vehicle comprises a current vehicle speed, a steering angle of the steering wheel of the vehicle and revolving speeds of the tires of the vehicle, the guiding information generating unit 32 comprises:

a weather condition obtaining module configured for obtaining local weather conditions of several continuous days;

a damping coefficient obtaining unit configured for confirming a damping coefficient of a road surface via the local weather conditions and the road condition information;

a normal pressure value and revolving speed obtaining module configured for obtaining pressure values and revolving speeds of the tires of the vehicle under the circumstance that the vehicle travels in normal condition according to the current vehicle speed;

a current pressure value calculating module configured for calculating current pressure values of the tires of the vehicle according to the revolving speeds of the tires working in normal condition, the damping coefficient of the road surface, the pressure values of the tires working in normal condition, the current steering angle of the steering wheel of the vehicle, a predetermined correcting parameter and the current revolving speeds of the tires of the vehicle;

a tire steering guiding information generating module configured for generating driving behavior guiding information for providing vehicle drivers with guidance of driving within limited speed or inflating the tires of the vehicle immediately if the pressure values of the tires of the vehicle exceeds or are less than the pressure values of tires working in normal condition.

Specifically, the vehicle operating information includes a current vehicle speed, the road surface condition information includes turning information of the road surface, the guiding information generating unit 22 comprises:

a sharp turn judging module configured for judging whether the vehicle moves into a sharp turn position of the road surface;

a sharp turn driving guiding module configured for judging whether the vehicle is able to pass through the sharp turn position safely according to the current vehicle speed and the position information of the vehicle, and warning the driver of the vehicle to slow down and drive with a slow speed when the vehicle is moving into the sharp turn position of the road surface.

Specifically, the operating information of the vehicle includes a current vehicle speed and a current revolving speed of the engine of the vehicle, the road surface condition information includes gradient information of the road surface, the guiding information generating unit 32 comprises:

a gradient judging unit configured for judging whether the vehicle moves into a steep gradient position of the road surface according to the gradient information of road surface;

a gradient driving guiding module configured for judging whether the vehicle is able to pass through the steep gradient position according to the current vehicle speed, the current revolving speed of the engine of the vehicle and the position information of the vehicle, and warning the driver of the vehicle to accelerate drive speed or slow down and drive with a slow speed when the vehicle is moving into the steep gradient position of road surface.

The apparatus for generating driving behavior guiding information can be applied in any one of the above-mentioned method embodiments, in regard to the specific content, please refer to the description in the first embodiment of the present invention mentioned above, and is not repeated herein.

It should be noted that in the system embodiment mentioned above, the units incorporated in the system are divided by their logic functions, but there is no limitation to the dividing of the units as long as the functions of the units can be realized, besides, specific names of these function units are used for distinguishing from each other merely, rather than limitation to the protecting scope of the present invention.

The above-mentioned specific embodiments are preferred embodiments in the present invention, the present application is not limited to the above-mentioned specific embodiments. In the inspiration of the present application, those skilled in the art may make many modifications, without going beyond the purpose and the scope the claims intend to protect of the present application.

The invention claimed is:

1. A method for generating driving behavior guiding information in a server that communicates with a vehicular terminal and a terminal device bound with a vehicle to generate driving behavior guiding information, wherein the method comprises:

receiving, by the server, operating information of the vehicle, position information of the vehicle, and road condition information sent from the vehicular terminal, the vehicular terminal including:

a vehicle operating information obtaining module connected to a vehicle-mounted self-diagnostic system of the vehicle, the vehicle operating information obtaining module including a controller area network (CAN) bus sub-module and a diagnosis sub-module that are connected to an on-board diagnostic (OBD) system of the vehicle to monitor CAN data of the vehicle and obtain the operating information of the vehicle, the operating information of the vehicle including a current vehicle speed, a current steering angle of a steering wheel of the vehicle, and current revolving speeds of tires of the vehicle a global position system (GPS) module that collects vehicle position information, a gravity sensor that collects road condition information, and a 3G module that transmits the operating information of the vehicle, the position information of the vehicle, and the road condition information to the server;

generating, by the server, driving behavior guiding information according to the operating information of the vehicle, the position information of the vehicle, and the road condition information as received from the vehicular terminal; and transmitting, by the server, the driving behavior guiding information to the terminal device bound with the vehicle;

wherein generating the driving behavior guiding information according to the operating information of the vehicle, the position information of the vehicle, and the road condition information as received from the vehicular terminal includes:

obtaining local weather conditions of several continuous days according to the vehicle position information received from the GPS module;

confirming a damping coefficient of a road surface via the local weather conditions received from the GPS module and the road condition information received from the gravity sensor;

obtaining pressure values and revolving speeds of the tires of the vehicle when the vehicle travels in a normal condition according to the current vehicle speed;

calculating current pressure values of the tires according to the revolving speeds of the tires working in the normal condition, the damping coefficient of the road surface, the pressure values of the tires working in the normal condition, the current steering angle of the steering wheel of the vehicle, a predetermined correcting parameter, and current revolving speeds of the tires, the calculating the current pressure values of the tires including:

if the current pressure values of the tires exceed the pressure values of the tires in the normal condition, generating, by the server, the driving behavior guiding information for providing vehicle drivers with guidance to drive within a limited speed; or if the current pressure values of the tires are less than the pressure values of the tires in the normal condition, generating, by the server, the driving behavior guiding information for providing vehicle drivers with guidance to inflate the tires.

2. The method according to claim 1, wherein the vehicle operating information includes the current vehicle speed, the road condition information includes turning information of road surface; generating the driving behavior guiding information according to the operating information of the vehicle, the position information of the vehicle and the road condition information further comprises:

judging whether the vehicle is driven into a sharp turn position of the road surface according to the vehicle position information received from the GPS module;

if the vehicle is driven into the sharp turn position of the road surface, judging whether the vehicle is able to pass through the sharp turn position safely according to the current vehicle speed and the position information of the vehicle, and warning the driver of the vehicle to decrease drive speed when it is judged that the vehicle is unable to pass through the sharp turn.

3. The method according to claim 1, wherein the vehicle operating information includes the current vehicle speed and a current revolving speed of the engine of the vehicle, the road condition information includes a gradient information of a road surface, generating of the driving behavior guiding information according to the operating information of the vehicle, the position information of the vehicle and the road condition information comprises:

judging whether the vehicle is driven into steep gradient position of road surface according to the gradient information of road surface from the GPS module;

if the vehicle is driven into the steep gradient position of the road surface, judging whether the vehicle is able to pass through the steep gradient position according to the current vehicle speed, the current revolving speed of the engine of the vehicle and the position information of the vehicle, and warning the driver of the vehicle to accelerate drive speed when it is judged that the vehicle is unable to pass through the steep gradient position.

4. The method according to claim 1, further comprising:
pre-establishing a binding relationship between the vehicle and the terminal device bound with the vehicle.

5. The method according to claim 1, further comprising:
modifying personal driving behaviors according to the current driving behavior guiding information and historical driving behavior guiding information of the vehicle.

\* \* \* \* \*